June 17, 1924.
J. W. KEEVER
1,498,172
COMBINATION CUP AND VALVE FISHING TOOL
Filed March 10, 1922    2 Sheets-Sheet 1
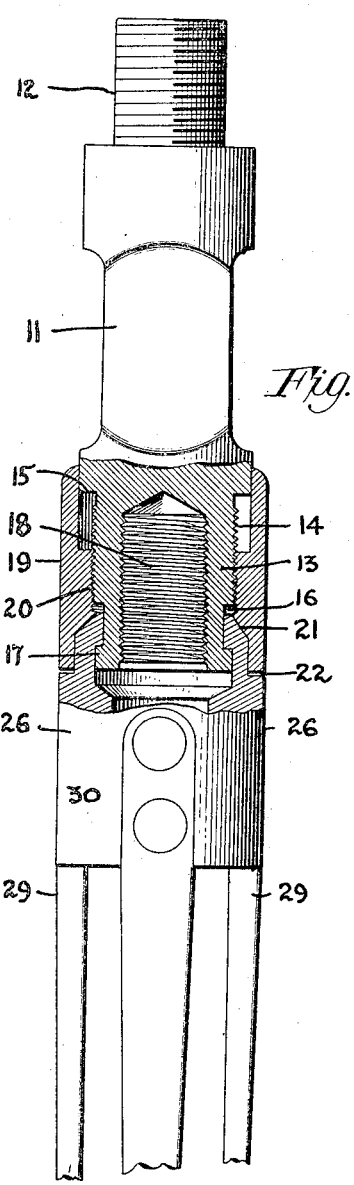
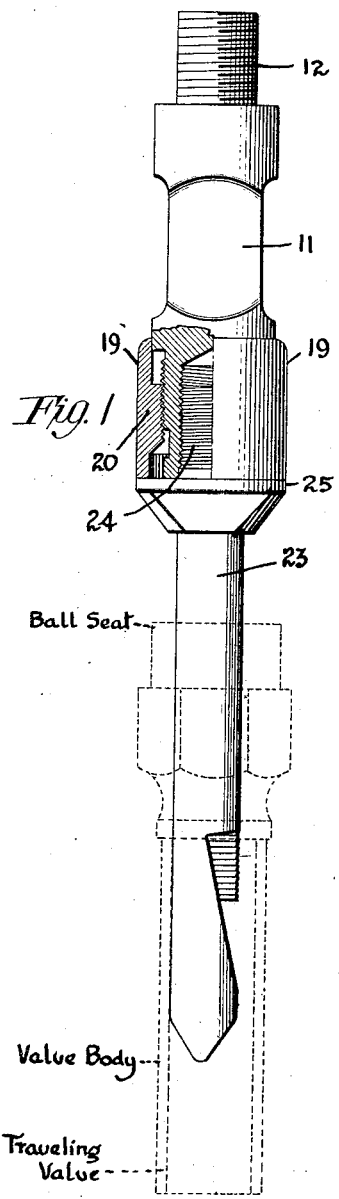
Inventor
JOSEPH W. KEEVER,
By Arthur Middleton
Attorney June 17, 1924.
J. W. KEEVER
1,498,172
COMBINATION CUP AND VALVE FISHING TOOL
Filed March 10, 1922  2 Sheets-Sheet 2
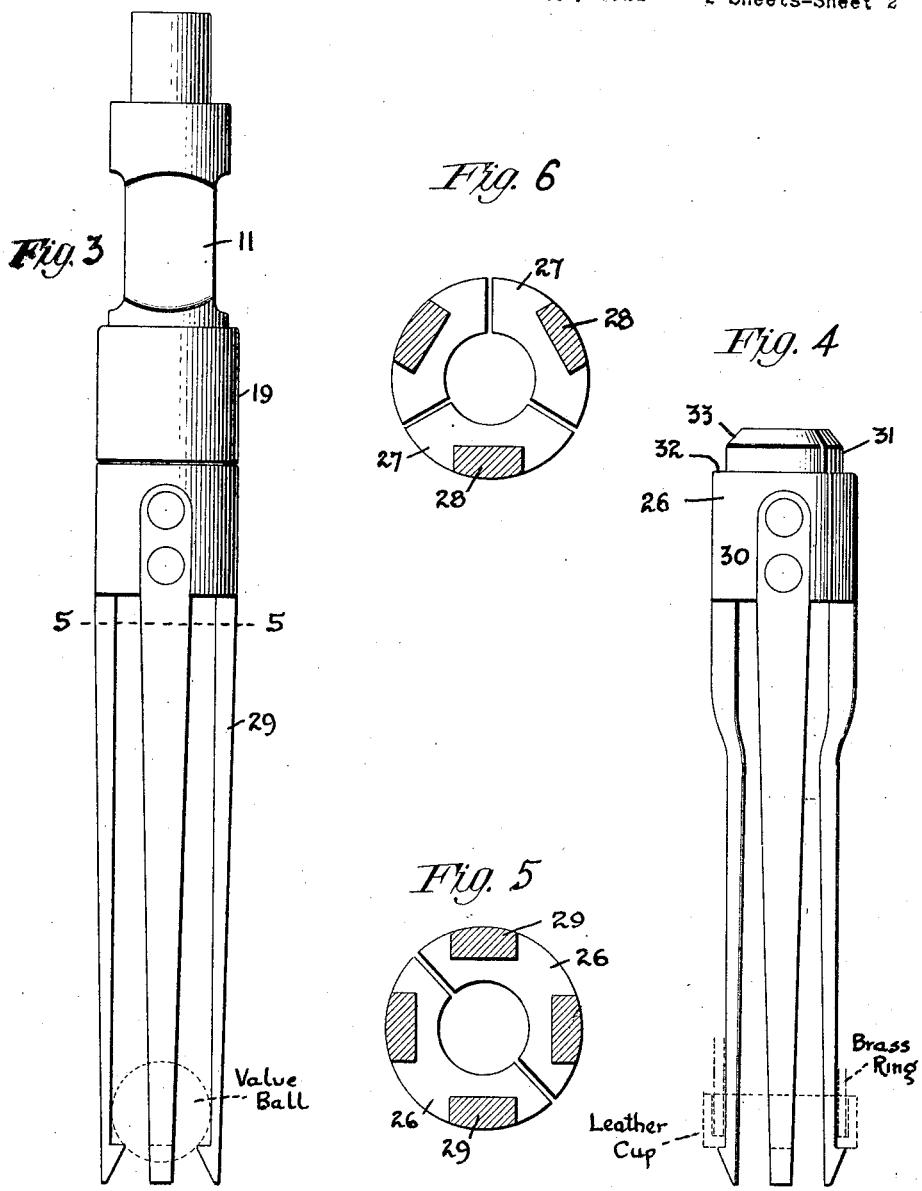
Inventor:
Joseph W. Keever,
By Autun Middleton
Attorney Patented June 17, 1924.

1,498,172

UNITED STATES PATENT OFFICE.

JOSEPH W. KEEVER, OF PARKERSBURG, WEST VIRGINIA, ASSIGNOR TO ACME FISHING TOOL COMPANY, OF PARKERSBURG, WEST VIRGINIA, A CORPORATION OF WEST VIRGINIA.

COMBINATION CUP AND VALVE FISHING TOOL.

Application filed March 10, 1922. Serial No. 542,604.

To all whom it may concern:

Be it known that I, JOSEPH W. KEEVER, a citizen of the United States, residing at Parkersburg, West Virginia, have invented certain new and useful Improvements in Combination Cup and Valve Fishing Tools, of which the following is a specification.

This invention relates to fishing tools for oil well tools and particularly to a combination cup and valve fishing tool.

The arrangement of the parts in the oil well apparatus for which the tool of this invention is designed to fish, comprises (in descending order) the line, the rope socket, the polish rods or sinkers, the wooden sucker rod or trip, the valve stem and the valve. The valve comprises, in descending order, a valve cage, a ball, ball seat, a valve body and the rings and cups. It is the valve that occasionally has to be fished for and the tool of this invention is for so doing but as one can never foretell which parts of the valve will be left in the well, the tool must be capable of fishing for any of its parts. That is, the whole valve may be removed by a grab engaging the valve cage, or the cage may pull off, leaving the ball to be fished for separately and later the valve seat and body to be fished for with a spear. Likewise, the cup and rings may sometimes come up with the valve body, while again they may be left in the barrel whereupon they will be fished for with a special grab.

Therefore, it may be necessary to use a spear, or two different kinds of pronged grabs so that a part of my invention is to devise a single fishing tool body to which can be removably secured any one of the said spear or grabs without in any manner lessening the full functioning of said spear or grabs.

I have disclosed herein the best embodiment of my invention of which I am at present advised, it being understood however, that this embodiment is shown in an illustrative sense and not a limiting one, for obviously the invention is capable of many different embodiments without departing from its spirit and scope.

The embodiment of my invention chosen for illustration is illustrated in the accompanying drawings, in which:

Figure 1 is an elevation of my fishing tool with a spear in place therein, parts being broken away to show the manner of holding the spear in position;

Fig. 2 is an elevation of my device with parts broken away to show the manner of holding a grab in position;

Fig. 3 is a full elevational view of my tool with a grab in place therein;

Fig. 4 is an elevational view of a grab with which my tool is adapted to co-act;

Fig. 5 is a transverse sectional view taken along the line 5—5 in Fig. 3;

Fig. 6 is a view similar to Fig. 5 but of a three prong grab instead of a four prong grab.

Speaking more particularly, the invention comprises a tool body to which can be operatively attached different fishing tools such as a spear or a grab. The body is constructed to have the usual sub 11 and threaded shank 12. The sub 11 terminates in a sleeve-like extension 13 which is provided with an exterior threaded portion 14, a shoulder 15, an exterior groove 16, whereby between the groove and the free end of the extension, there is left a flange-like part 17. The extension is further provided with a threaded aperture or socket 18 therein. Encircling said extension is a sleeve 19 provided with a thickened part 20 threaded to co-act with the threaded part 14 of the extension 13 whereby the sleeve 19 can be rotated to move it longitudinally upon the extension 13. The thickened part 20 has an inclined face 21 somewhat spaced from the end edge 22 of the sleeve.

Assuming now the tool has co-operatively connected thereto a spear 23, as shown in Fig. 1 which is of usual construction and provided with a threaded shank 24 adapted to be screwed into the socket 18, and is further provided with a reinforced collar 25. To assemble the spear 23 and the tool body, the sleeve 19 is first moved upwardly or toward the sub 11 to expose the end of the extension 13 so that the spear shank 24 can be easily and tightly screwed into the socket 18. The spear is made fast to the body by the engagement of the threads on the shank and the socket but they are so arranged that the flat face of the collar 25 on the spear is thereby held in engaging contact with the free end of the extension. Then the sleeve 19 is screwed downwardly toward the spear until its edge 22 engages tightly the flat face of the collar 25 whereupon, the spear will be found to be very securely locked to the tool body for the sleeve 19 acts as a jamb nut. To remove the spear, these operations are reversed.

Assuming now it is desired to attach to the tool body a grab either of the three or four prong type or of the inside or outside grab type, the construction of the grabs is substantially the same except for the number of prongs they have and the direction of the tines thereon, although while the body part of the grabs are made in sections, the four pronged grab is made into two sections 26 (Fig. 5) whereas the three pronged grab has to be made into three sections 27 (Fig. 6). The grabs are shown at 28 in the three prong type and at 29 in the four prong type.

The grabs have a uniform body 30 to which the prongs, 28 or 29 are secured preferably flush with the exterior periphery of the body. The body is provided with a reduced upper extension 31 whereby a shoulder 32 is formed on the body. The upper end of the extension 31 is tapered as at 33.

To assemble a grab and the tool body, the sleeve 19 is screwed back or up to uncover the groove 16 on the extension 13. The sections 26, or 27 as the case may be, are applied to the tool body with the jaws 35 entering the groove 16 and are then manually held in that position until the sleeve 19 can be screwed down until its inclined face 21 contacts with the taper 33 on the grab body extension 31 to force the jaws thereof into the groove 16 in which position, the sleeve holds them securely. To remove the grab, these operations are reversed.

It will be noted that this form of securing the grab to body is advantageous in that wear of the parts is provided for whereby they can be taken up. For instance, the groove 16 is wider than the jaws 35 are long so they can be slightly displaced to different adjusted positions if desired and as the jaws are locked in place by the complementary tapered surfaces 21 and 33, any wear can be easily taken up. Moreover, the flange 17 on the extension 13 engages the upper extremity of the tool so that the sleeve 19 not only locks them securely to the tool extension 13 but maintains them rigidly in that position against pivotal or tilting movement. As the three and four prong grabs have the same body construction, it will be unnecessary to describe separately the attachment to and detachment from the tool body of those grabs.

It will thus be seen that I have devised a combination cup and valve fishing tool of simple construction, yet one which is strong and so designed that the one tool body will effectively but quick-detachably hold the various fishing tools needed to recover cups and valves, when they have to be fished for.

What I claim is:

1. In combination a tool receiving body having a threaded axial aperture therein, a circumferential groove on said body forming a flange between said groove and the end of said body, a tool having a reduced portion engaging said threaded aperture, a sleeve threaded to the exterior of the tool receiving body having a portion slidably engaging said body, and a portion jambing against said tool.

2. The device of claim 1, said tool having a portion extending between said body and said sleeve, a right angular projection in said extending portion lying in the groove on said body, the contact face between sleeve and tool being frusto-conical.

In testimony whereof I have affixed my signature to this specification.

JOSEPH W. KEEVER.